United States Patent [19]

McDonald

[11] B 3,916,107

[45] Oct. 28, 1975

[54] DIGITAL SYSTEM FOR RECLOCKING PULSE CODE MODULATION CIRCUITS

[75] Inventor: Henry Stanton McDonald, Summit, N.J.

[73] Assignee: Bell Telephone Laboratories, Incorporated, Murray Hill, N.J.

[22] Filed: Oct. 6, 1972

[21] Appl. No.: 295,674

[44] Published under the Trial Voluntary Protest Program on January 28, 1975 as document no. B 295,674.

[52] U.S. Cl...... 179/15 AP; 325/38 B; 340/347 DD

[51] Int. Cl.² ........................................ H04J 3/00

[58] Field of Search .................... 179/15 BS, 15 AP; 325/38 B; 340/347 DD

[56] References Cited

UNITED STATES PATENTS

| | | | |
|---|---|---|---|
| 3,707,680 | 12/1972 | Gabbard | 325/38 B |
| 3,707,712 | 12/1972 | Deschenes | 179/15 AP |
| 3,750,144 | 7/1973 | Bolus | 340/347 DD |

*Primary Examiner*—Ralph D. Blakeslee
*Attorney, Agent, or Firm*—C. S. Phelan

[57] ABSTRACT

Time division multiplexed pulse code modulated digital character signals received from a transmission medium are demultiplexed and converted into respective delta modulation signals in accordance with a first set of time base information derived from the pulse code modulated signals. This operation removes pulse code character and time division frame time restrictions. The delta modulated signals are recoded to a predetermined pulse code modulated format, such as differential pulse code modulation, in accordance with a second set of time base information for appropriate further processing or transmission.

14 Claims, 5 Drawing Figures

DIGITAL SYSTEM FOR RECLOCKING PULSE CODE MODULATION CIRCUITS

BACKGROUND OF THE INVENTION

1. Field of the Invention

This invention relates to the resynchronization of pulse coded digital signals at an interface between digital systems that are operated in accordance with different, unsynchronized time bases.

2. Description of the Prior Art

Digital signal transmission or processing systems are usually operated in accordance with a predetermined system time base, i.e., periodically produced timing information or signals that are employed throughout the system to permit orderly synchronous operation of the system. Such time base information is provided by a local oscillator, sometimes called a clock, operating at the highest frequency required; and either all or selectable ones of the oscillator output pulses are employed for implementing system control.

If plural digital systems cooperate with one another, their respective clocks may or may not be synchronized to assure compatible operation. In digital communication systems, wide geographical separation between clocks for operating systems may make synchronization of those clocks expensive. However, frequency differences between unsynchronized clocks can cause loss of data synchronization between a data transmitter and a data receiver.

It is well known that where time multiplexed pulse coded signals are involved, the problem of obtaining and maintaining synchronization between cooperating systems is difficult. These difficulties are outlined, for example, at pages 14 and 15 of an article entitled "An Experimental Pulse Code Modulation System for Short-Haul Trunks," by G. C. Davis, Vol. XLI, No. 1, January, 1962, *Bell System Technical Journal.* The Davis article deals with time division multiplexed, pulse code modulated (PCM) signals in a transmission system commonly called the T-carrier system. In arrangements of that type, time frame divisions in the signal time base are indicated by a unique character that can be erroneously transmitted, and thereby produce a temporary loss of frame synchronization with a consequent loss of data information while synchronization is being reestablished. The framing information is vital to most processing operations, e.g., time slot interchanging, that are carried out with respect to time multiplexed signals.

It is, of course, known that time multiplexed pulse coded signals formed according to a first time base can be demultiplexed and demodulated to their analog format and then resampled, remodulated, and remultiplexed in accordance with a second set of time base information. However, the demodulation and remodulation are very costly in terms of equipment because of the need for the use of precision impedance components in order to preserve information fidelity.

It is, therefore, one object of the present invention to improve digital signal reclocking systems.

It is another object to reduce the potential for information loss during the transmission of digital signals through an interface between cooperating digital systems having different unsynchronized time bases.

A further object is to accommodate cooperating digital systems operating on unsynchronized clocks by employing digital coupling circuits for coupling signals between the systems.

STATEMENT OF THE INVENTION

The foregoing and other objects of the invention are realized in an illustrative embodiment in which pulse coded digital signals are reduced to a delta modulation format in accordance with time base information contained in those signals. The delta modulated format of the signals is then converted to a predetermined digitally coded format, which may be the same format as the input digital signals, utilizing a second time base.

It is one feature of the invention that the information signals involved are placed in a differential pulse code modulated signal format both prior to and after being converted to the delta modulation signal format.

It is another feature that the reduction and conversion operations are achieved by means of digital circuits which may be readily incorporated into integrated semiconductor device arrangements without extraordinarily precise circuit element formation methods.

It is a further feature that the signals in the delta modulated format are independent of the exact framing of the incoming PCM stream since it is a well-known property of delta modulation that each data bit has equal weight. When the delta modulation format is then converted into a new pulse coded format, framed to a different time base from the incoming data, essentially no information is lost or distortion generated. In addition, no high precision analog signals need be generated as the entire format converting process is carried out using digital signals.

In one embodiment of the invention the phases of bit clock rate signals of input signal and local signal time bases are compared, and any phase difference error is quantized and employed to control the signal format reduction circuits for offsetting high frequency roll-off which is due to such phase difference.

In one application of the invention a switching network processes the recoded digital signals for selectively connecting different incoming signal lines with one another, and further signal reduction and conversion operations are performed after network switching to restore the signals to their original type of coding and multiplexing, but governed by a new time base.

BRIEF DESCRIPTION OF THE DRAWINGS

A more complete understanding of the invention and the various features, objects, and advantages thereof may be obtained from a consideration of the following detailed description in connection with the appended claims and the attached drawing in which:

DETAILED DESCRIPTION

The present invention accommodates different clock rates of first and second, coupled, pulse coded signal channels. However, the invention is here described, without limitation, in a time division multiplex environment since pulse coded signal channels are frequently utilized in such an environment. Time division aspects are not extensively treated since the design and operation of time division systems are well known in the art and are not necessary to an understanding of the present invention.

Figure 1:
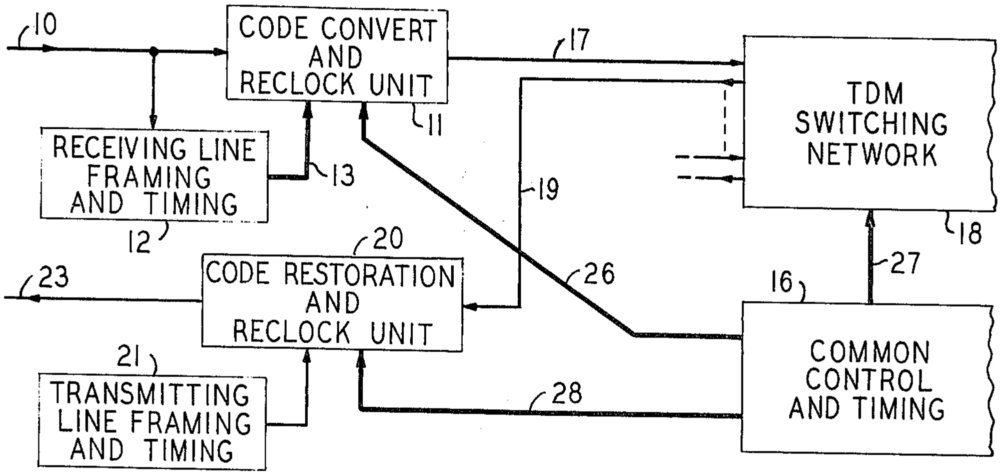
FIG. 1 is a simplified block and line diagram of a time division multiplex communication system utilizing the present invention.

In the communication system of FIG. 1, time division multiplexed, pulse code modulated signals are supplied on a circuit 10 to a code converting and reclocking unit 11. In the unit 11 the signals are converted to a delta modulation signal format under the control of time base information derived from the input signals by a line framing and timing circuit 12 that is coupled on a timing bus 13 to the unit 11. The resulting delta modulation signals are further converted to a suitable pulse coded format under the control of time base signals provided in circuits of a bus 26 from a common control 16. The resulting output from unit 11 is applied by way of a receiving circuit 17 to a time division multiplex switching network 18, of any suitable type, wherein the signals are routed to a selectable one of the network transmitting circuits such as the transmitting circuit 19. The latter circuit extends to an input of a code restoration and reclocking unit 20 wherein the signals are once again reduced to the delta modulation format, under the control of time base signals in circuits of a bus 28 from the common control 16, and then restored to the output pulse coded format under the control of time base signals from a line framing and timing circuit 21 for application to an output circuit 23. If the system to which circuit 23 extends does not have an independent clock, circuit 21 can be omitted and unit 20 simplified as will be subsequently shown.

Common control 16 and network 18 are indicated in FIG. 1 as open-ended boxes in schematic representation of the fact that they include many system functions of no direct concern to the present invention. Likewise details of common control 16 and network 18 are not part of this invention and are hereinafter mentioned only briefly. An example of a time division switching system operated by common control processor and timing is found in the copending application Ser. No. 185,748, filed Oct. 1, 1971, for G. D. Johnson, K. L. Nicodemus, G. C. Schumacher, and M. F. Slana, entitled "Time Division Switching System," now U.S. Pat. No. 3,736,381, and assigned to the same assignee as the present application.

The network 18 is advantageously provided with a plurality of input connections, at least a portion of which are advantageously of the same type represented by the receiving circuit 17. Similarly, the network has a plurality of transmitting circuits, at least a portion of which are advantageously of the type represented by the circuit 19. There is, of course, one transmitting circuit corresponding to each receiving circuit for two-way communications. Operation of the network 18, for establishing proper connections in respective time slots of a time division signal frame, is carried out under the control of the common control 16 in a manner which is now known in the art and utilizing signals in circuits of a bus 27. Briefly, such a processor operates in accordance with a stored program for performing various arithmetic and logic functions upon data previously supplied thereto and other data derived from various signal circuits associated with the system. Such a common control typically has appropriate memory facilities associated therewith and clocking facilities for fixing the operating time base for the entire system including the network, the network control memory, and circuits controlled by the network. It is one purpose of this invention to enable such a switching system network to interconnect digital transmission facilities without introducing significant distortion even though the facilities operate from clock sources differing from the network clock in both frequency and phase. That is, the time bases of the network and of the digital transmission facilities are not synchronized to one another.

Figure 2:
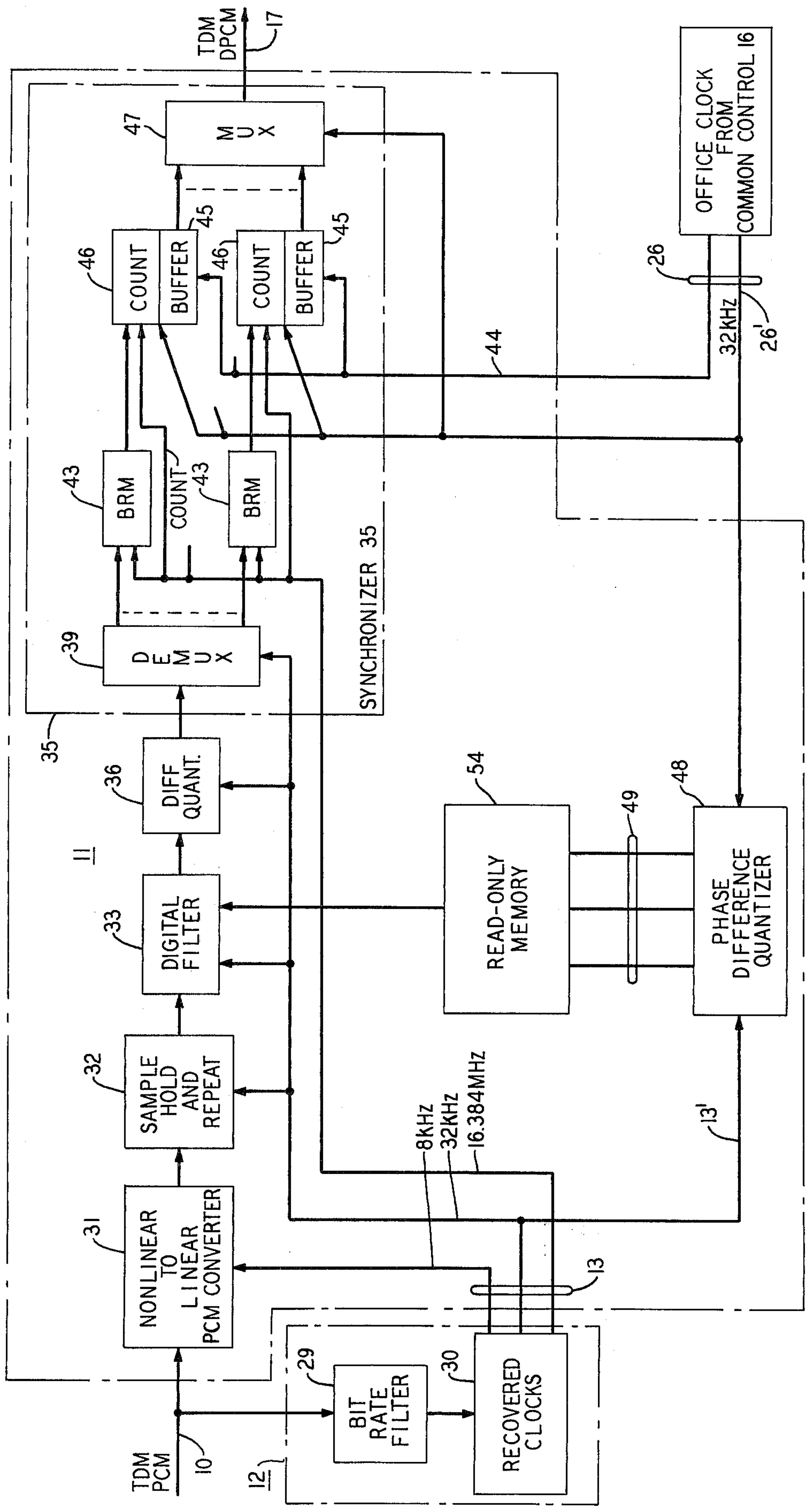
FIG. 2 is a block and line diagram of a code converting and reclocking unit employed in the system of FIG. 1.

FIG. 2 represents a block and line diagram of the code converter and reclocking unit 11 employed in the system of FIG. 1. In the line framing and timing circuit 12, a bit rate filter 29 and a circuit 30 schematically represent any convenient one of the variety of clock recovery circuit arrangements known in the art. One type of such arrangement is outlined in the aforementioned Davis article. Filter 29 receives the time division multiplexed, PCM signals from the input circuit 10. These signals are illustratively at a 1.544 MHz rate for the aforementioned T-carrier system. Filter 29 is a bandpass filter, and its output is utilized in a circuit 30 for recovering the various clock signal rates that are needed to constitute the time base information for converting the received multiplexed PCM signals to the delta modulation format as previously outlined. To this end, only clock signals of 8 kHz, 32 kHz and 16.384 MHz are shown in FIG. 2 on different circuits of the bus 13 for distribution in the code converting and reclocking unit 11. The 16.384 MHz rate is advantageously obtained by including in circuit 30 a local oscillator operating at that rate and synchronized with the incoming 1.544 MHz rate by dividing both to a common 8 kHz rate, comparing the two derived signals, and using the error in a phase locked loop to control oscillator frequency. Assuming the aforementioned T-carrier type of system, these are the principal frequencies required for consideration of a single one of the 24 time slot channels on circuit 10 since the description of FIG. 2 will be presented primarily on a single-channel basis to facilitate an understanding of the invention. Utilization of the recovered clock signals for all of the time slot channels in a manner similar to that here presented for FIG. 2 produces operation as described but wherein all time slot channels utilize the indicated circuits on a time shared basis unless otherwise noted.

The 8 kHz recovered clock is applied to a nonlinear-to-linear PCM converter 31. This circuit is employed because it is advantageous to transmit over expensive transmission facilities using the PCM signals in a low rate nonlinear PCM coded format which utilizes unequal increments between coding levels. However, linear PCM coding, i.e., coding with equal increments between a larger number of coding levels, is more convenient for signal processing. Circuits utilized in the converter 31 for this purpose are of a type well known in the art, and are thus not shown in detail. In outline, however, they include circuits for utilizing the magnitude bits of the nonlinear PCM code characters, each character representing a different code interval between PCM coding decision levels defining the interval, as addresses for accessing a read-only memory. Each of the addressed locations stores a corresponding linear PCM code character which is read out when the location is addressed. Assuming a typical 193-frames-per-second rate on circuit 10, the 8 kHz clock is utilized for representing the PCM code conversion of the 8,000 samples per second per time slot channel in the 1.544 MHz bit stream received from the circuit 10. Output from the read-only memory is combined with the sign information from the corresponding input nonlinear PCM code characters to reconstitute a binary, sign-magnitude code representation which is then advantageously converted to the 2s complement format for convenient further processing. In the latter format, signals are coupled from the converter 31 to a sample hold and repeat circuit 32 at the rate of 8,000 8-bit linear PCM characters per second per channel.

Since the switching system illustrated in FIG. 1 advantageously employs a much higher sample rate than that which is provided from the converter 31, the circuit 32 is employed for increasing the number of samples per second without altering the information content of the characters. Thus, in circuit 32 each sample is advantageously entered into a first register at the 8,000 samples per second per channel rate and then transferred to a suitable buffer register from which it is gated out 4 times in bit series to produce an output comprising 32,000 signal samples per second per channel. For this purpose the circuit 32 utilizes the 32 kHz clock to represent that output sample rate for one channel.

Output from the sample hold and repeat circuit 32 is then coupled in bit series to a digital filter 33 which also employs the 32 kHz clock indicating the processing of 32,000 samples per channel per second. This filter is advantageously a 4th order filter of conventional type as shown, for example, in FIG. 2 of an article "An Approach to the Implementation of Digital Filters" by L. B. Jackson, J. F. Kaiser, and H. S. McDonald, which article appeared at pages 413–421 of *IEEE Transactions on Audio and Electroacoustics*, Vol. AU–16, No. 3, September, 1968. In a fourth order filter of that figure, $m = 2$; and the filter thus has two second order sections. The filter 33 is required in order to smooth the repeated samples from circuit 32 to remove undesirable steps introduced by the sample repeating process. Filter multiplier coefficients are established to form a low pass filter having a cut-off frequency that is just below one-half of the input line sampling frequency which is in this example 8,000 samples per second. In general, most of the multiplier coefficients are fixed. However, in subsequently described signal processing within unit 11 of FIG. 2 herein, a small variation of gain occurs near the low-pass filter 33 cut-off frequency. In order to correct for this high frequency roll-off, one of the filter multiplier coefficients, such as $\beta_{11}$ in the filter of the Jackson et al FIG. 2, is made variable as will be subsequently herein described.

Figure 4:
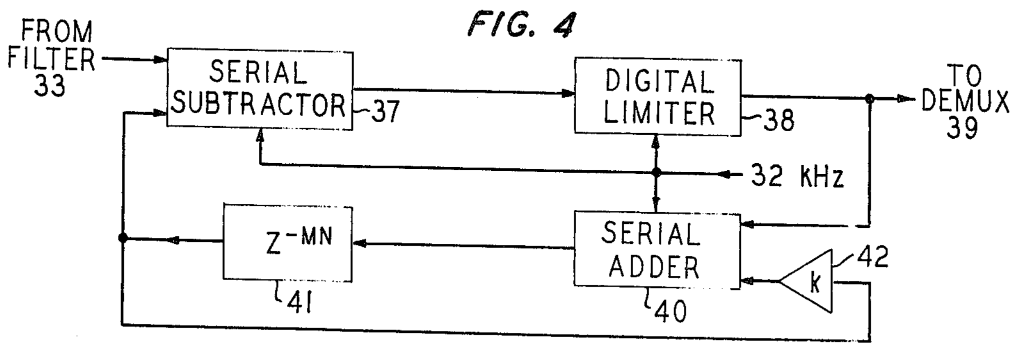
FIG. 4 is a block and line diagram of a differential quantizer utilized in the unit of FIG. 2.

The repeated and filtered PCM characters, in bit series form, are provided from the digital filter 33 to a digital differential quantizer 36 which converts the linear PCM code to a differential pulse code modulated (DPCM) format. The quantizer 36 is similar in function to an analog predictive quantizer such as that utilized in FIG. 1 of the R. E. Graham U.S. Pat. No. 3,026,375. Details of the digital quantizer are here illustrated in FIG. 4, wherein the 32 kHz clock is employed to indicate processing of 32,000 samples per channel per second. In FIG. 4 a serial subtractor 37 receives the linear PCM characters from the filter 33 and subtracts from each such character the corresponding time slot character from the preceding time division signal frame. The resulting arithmetic difference, a 16-bit character, produced by subtractor 37 is coupled through a digital amplitude limiter 38 to a demultiplexer 39 of FIG. 2. Limiter 38 operates under control of the 32 kHz clock for simply deleting from each received difference character the seven least significant bits, and thereby providing a 9-bit DPCM character output to the demultiplexer. The same 9-bit DPCM characters are also fed back through a serial adder 40 and a single frame delay circuit 41 to the minuend input of the serial subtractor 37 for subtraction from the input PCM word of the same time slot position in a new time division signal frame. The delay is indicated by the character $Z^{-MN}$, where M is the number of bits per sample and N is the number of time slot samples per frame. Details of subtractors and adders of the type mentioned are well known in the art and comprise no part of the present invention.

The output of the delay circuit 41 is also fed back through a multiplier 42 wherein it is multiplied by a factor $k = 1 - 2^{-5}$ for application as the second input to the serial adder 40. Thus, the adder 40, delay circuit 41, and multiplier 42 comprise an accumulator for reconverting the DPCM characters in the output of limiter 38 to the linear PCM format for use in the serial subtractor 37. Accumulator leakage is provided by selecting the value of $k$ in relation to the total sample rate in the quantizer to reduce accumulation of errors from character to character and thereby avoid accumulation of errors from sample to sample in a given time slot channel.

Returning now to FIG. 2, the demultiplexer 39 is part of a synchronizer 35 and operates in the usual manner for such demultiplexer circuits in response to the 32 kHz clock for distributing each of the DPCM sample characters in the 24 time slots of each time frame to its particular one of the 24 output circuits of the demultiplexer 39. For example, demultiplexer input signals are gated to respective output channel buffer registers for the different time slot channels of a frame. This operation, when considered in terms of samples for all time slot channels, eliminates the frame time divisions from the signal format.

The aforementioned output circuits, from the buffer registers, are applied to inputs of a corresponding number of binary rate multipliers 43, respectively, which are operated in response to the 16.384 mHz clock for converting the DPCM signals to a delta modulated signal format as is well known in the art. The latter format, of course, lacks the digital character time divisions since each bit in the delta modulation format has the same weight.

Binary rate multipliers are well known in the art and generally operate on an input clock signal and a binary coded word signal to produce an output pulse train having a pulse rate corresponding to the magnitude represented by the coded word. Illustrative multipliers are shown in an article "Binary Rate Multipliers with Smooth Outputs" by H. Mergler, in *Control Engineering*, March, 1966, pages 73–74; and in a paper, "A High Speed Binary Rate Multiplier" by A. R. Elliott, in

*Proceedings of the IEEE*, August, 1971, pages 1,256–1257.

Each binary rate multiplier 43 in synchronizer 35 functions for only one time slot channel signal per frame and so handles 32,000 9-bit DPCM samples per second for the illustrated example. However, each such sample must be represented by a larger number, e.g., 256, of delta modulation signal train bits as schematically represented in FIG. 2 by supplying the 16.384 MHz recovered clock from circuit 12 to each binary rate multiplier 43. Thus, each multiplier produces an output delta modulation signal train at the 16.384 MHz signal bit rate. Those trains are applied to respective ones of counters 46, each of which receives the same 16.384 MHz recovered clock as count-enabling drive.

Counters 46 are up-down counters, and each has an associated output buffer shift register 45 for coupling counter output to an input of a multiplexer 47. Typically, a counter 46 counts up one count in response to coincidence of a clock counting pulse and a delta modulation signal train pulse. If only the clock pulse is received, the counter counts down by one step. Periodically, i.e., at the 32,000 samples per second rate, the contents of each counter are coupled to its associated buffer register; and the counter is preset to its midrange count in preparation for the next signal frame. The latter function takes place in response to a 32 kHz office clock signal provided from common control 16 on a circuit 26' in bus 26. The same 32 kHz clock also applied to multiplexer 47 to indicate its operation at that sample per channel rate.

An office clock signal higher than the 32 kHz sample per channel rate is supplied to each register 45 by a circuit 44 in cable 26 as a shift clock when the contents of that register are to be taken by multiplexer 47 for application to circuit 17. This clock causes any register contents, the DPCM form of the signal, to be promptly supplied to multiplexer 47 and must be at a rate that is at least sufficient to transfer the 16-bit DPCM word and still maintain real-time operation for the illustrative 32,000 samples per second per channel.

During the conversion operations performed, by synchronizer 35, in the unit of FIG. 2 between DPCM and delta modulation and then back to the DPCM format, there are limited effects which arise because the line clock, derived from circuit 10, and the office clock utilized on opposite sides of the delta modulation interface are not necessarily precisely in phase with one another. These effects involve both information accuracy and signal amplitude. Insofar as information accuracy is concerned, there is no significant loss of information. The phase difference between the two clocks causes a counter 46, following a binary rate multiplier 43, to accumulate parts from different incoming DPCM character samples; but the nature of the circuit combination is such that a linear interpolation is accomplished between adjacent DPCM character samples. Since the counter 46 integrates the output of the binary rate multiplier, the phase difference effect is lost without appreciably affecting the information content of the data. The result is that even a limited difference in frequency between the line clock and the office clock is distributed among successive characters without appreciably affecting information content. Small errors in the count of delta modulation pulses from one character period are picked up in adjacent character periods so that no cumulative effect is produced; and the only adverse information result is a slight increase in noise level.

In terms of signal amplitude, it has been found that the aforementioned possible phase difference between the line clock and the office clock tends to produce a high frequency roll-off effect on the information signals. It is well known that high frequency roll-off is a result of the averaging of adjacent samples of a signal. When the counter preset clock and binary rate multiplier control clock are out of phase, the counter 46 counts part of the pulses resulting from each of two successive DPCM input samples to the binary rate multiplier 43. The counter therefore performs a weighted average between incoming samples. The weights of this averaging process are a function of the relative phase of the two sample clocks on circuits in buses 13 and 26.

In order to reduce the roll-off effect, the two clocks are applied on circuits 13' and 26' to a phase difference quantizer 48 wherein the clock signals are, for example, both employed to control a three-stage counter (not separately shown). That counter is driven by pulses at a rate of, e.g., 256 kHz (for eight phase difference ranges) also provided by the office clock. Periodically the counter is preset to a midrange count of four by the 32 kHz signal on circuit 26', and the counter output is sampled by the 32 kHz signal on circuit 13'. The counter output is thus continuously indicative of the amount of phase difference between the two clocks, and it is applied to three quantizer output circuits 49. Those circuits are applied to the addressing inputs of an eight-word read-only memory 54 which contains eight coefficients for a multiplier of filter 33. Those coefficients each corresponds to a different one of eight clock phase difference ranges such that the output of the read-only memory 54 is an appropriate coefficient value for the feedback multiplier, e.g., the multiplier $\beta_{11}$, which operates on once-delayed sum signals in the first section of filter 33. Thus, a phase difference indication provided from quantizer 48 reads a corresponding coefficient out of memory 54 for application to filter 33. That output alters the coefficient on a real-time basis for modifying the output of digital filter 33 to compensate for the aforementioned roll-off effect.

In the case hereinbefore described of four sample repetitions, which raises the incoming sample rate per channel to 32 kHz from 8 kHz, the roll-off effect is very small; and it is compensated as just described using eight values of phase and one variable filter multiplier coefficient. If the repetition rate were lowered, more high frequency roll-off would result and more accurate phase quantizing to control more than one adjustable coefficient of the digital filter should be used.

Figure 3:
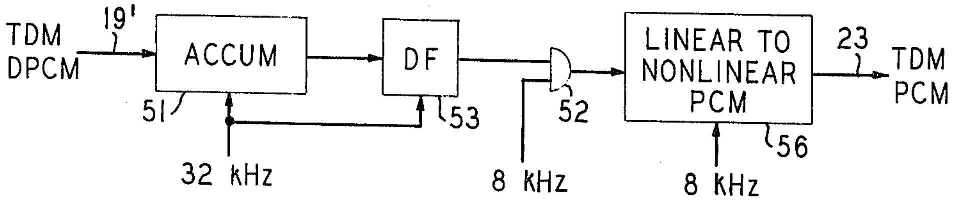
FIG. 3 is a block and line diagram of a code restoration and reclocking unit utilized in the system of FIG. 1.

FIG. 3 includes a simplified block and line diagram of the code restoration and reclocking unit 20 of FIG. 1. This unit is employed to restore DPCM signals received from the switching network 18 to a suitable format for application to the outgoing time division circuit 23. Input in FIG. 3 is shown as being received from a circuit 19', since the unit 20 normally includes different input circuits for different applications of the invention. Thus, in the system of FIG. 1, circuit 19 is coupled in unit 20 to circuit 19' of FIG. 3 through a synchronizer such as synchronizer 35 in FIG. 2. That synchronizer receives the DPCM code from network 18 under control of timing from common control 16 via bus 28 and produces DPCM code under the control of timing from the transmitting line framing and timing circuit 21. The latter code represents that which is actually received on the circuit 19' in FIG. 3. Circuit 21 advantageously recovers timing from an incoming circuit of the same system with which outgoing circuit 23 is associated.

Figure 1A:
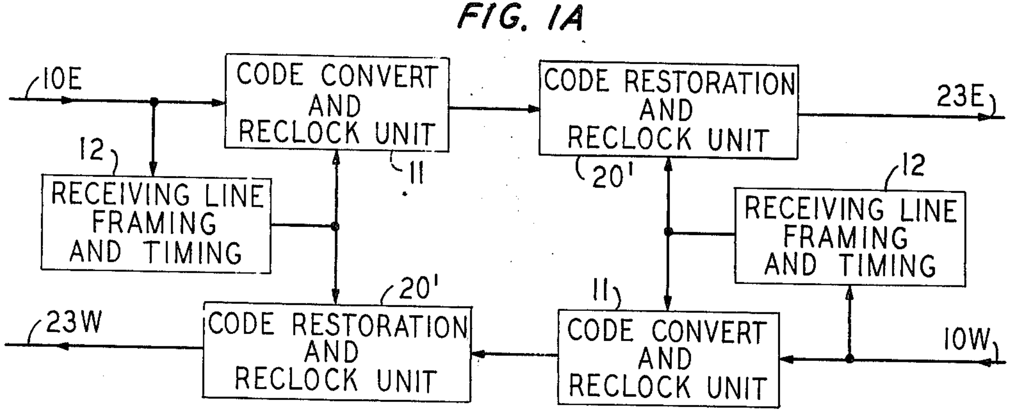
FIG. 1A is a simplified block and line diagram of a modified time division multiplex communication system utilizing the invention.

It will be apparent to those skilled in the art, and as indicated in FIG. 1A, that if one is simply interfacing time division multiplexed PCM lines, without including the switching capability of the network 18, the coupled outgoing and incoming circuits, and thus the timing, will be the same at all times. Consequently, the synchronizer 35 need not be included in code restoration and reclocking unit 20; and such a modified unit, including only the circuits of FIG. 3, is designated a unit 20'. A unit 11 and a unit 20' are included for each direction, e.g., east and west, of transmission in the two interfaced time division multiplexed PCM lines as indicated in greatly simplified form in FIG. 1A. However, no transmitting line framing and timing circuits 21 are required because the receiving line framing and timing circuit 12 for each direction, i.e., circuit 10E or 10W, also provides the transmit timing for the other direction, i.e., circuit 23W or 23E.

Signals on circuit 19' in FIG. 3 are applied in bit series to an accumulator 51 which operates at the 32 kHz sample rate per channel as indicated by the clock input thereto. Accumulator 51 includes an adder, a delay circuit and a feedback multiplier just as in the accumulator of the quantizer of FIG. 4. The accumulator receives successive DPCM words in corresponding time slots of successive time frames, and provides an output in the linear PCM format. That output is applied in bit series format, through a digital filter 53, to one input of a coincidence gate 52 which is actuated at one-fourth of the PCM character rate in order to reduce the signal down to the proper output line rate of 8,000 samples per second per channel. Such reduction merely offsets the effect of the sample hold and repeat circuit 32 in FIG. 2. The digital filter 53, which is similar in type and coefficients to the filter 33 of FIG. 2, is employed in FIG. 3 under the control of the 32 kHz clock for smoothing the linear PCM code representations received from accumulator 51 prior to application thereof through gate 52 to a linear-to-nonlinear PCM converter 56. Of course, if all circuits which can provide input to circuit 19 in FIG. 3 already have a filter such as filter 33, the filter 53 can be omitted. The converter 56 performs a read-only memory operation which is the inverse of that performed by the converter 31 in FIG. 2, and thus produces on the outgoing circuit 23 the time division multiplexed nonlinear PCM coded signals. That is, linear PCM code words are advantgeously rounded off to integers representing code levels and used to extract from a read-only memory corresponding nonlinear PCM code words. All of the circuits of FIG. 3 are, of course, operated under the control of time base information provided from an appropriate line framing and timing circuit, e.g., circuit 21, in FIG. 1.

It is apparent from the foregoing description that substantial numbers of circuit functions are required to implement the present invention and in addition to those otherwise provided for deriving time base information from the input circuit 10. However, the added circuit functions for reducing an input signal to a delta modulation format under the control of a first time base and then restoring it to a pulse coded character format under control of a second time base are all of a nature that (a) does not require costly precision impedance components, and (b) can be implemented in the present state of the art using simple gates and flip-flop circuits that are functionally clustered in such a way that many active circuits can be fabricated on a single silicon substrate at low cost.

The foregoing description has cast the invention in a communication system in which clock rate differences generally are relatively small, e.g., less than 1 percent. However, the invention is also useful in applications having other ranges of differences. For example, the invention has produced satisfactory operation for phase differences running to values in excess of thirty percent.

Although the invention has been described in connection with particular applications and embodiments thereof, it is to be understood that additional applications and embodiments which will be obvious to those skilled in the art are included within the spirit and scope of the invention.

What is claimed is:

1. In combination, means for providing digital signals encoded according to a first time base, means for converting said digital signals to a delta modulation format, and means for encoding said delta modulation signals in a predetermined coded format according to a second time base which is independent, in frequency and phase, of said first time base.

2. The combination in accordance with claim 1 in which said providing means provides said digital signals in time division multiplexed signal format, said converting means includes means for demultiplexing said time division multiplex signals in accordance with said first time base, and said encoding means includes means for multiplexing signals in said predetermined coded format in accordance with said second time base.

3. The combination in accordance with claim 1 in which said converting means comprises a binary rate multiplier, and said encoding means comprises means for counting delta modulation signal pulses in each of successive recurring time intervals at an output of said multiplier.

4. The combination in accordance with claim 1 in which said providing means provides said digital signals in time division multiplexed signal format, said converting means includes means for demultiplexing said time division multiplex signals, and plural binary rate multipliers, one connected to each output of said demultiplexing means, and said encoding means includes plural counters, one connected to count delta modulation signal pulses in each of recurring time intervals at an output of a different one of said multipliers, and means for multiplexing signals from said counters.

5. The combination in accordance with claim 1 in which said digital signals are differential pulse code modulated signals encoded according to said first time base, said converting means includes means for converting said differential pulse code modulated signals to a delta modulated signal format in accordance with said first time base, said encoding means includes means for encoding said delta modulated signals into a differential pulse code modulated signal format according to said second time base, and means are provided for accumulating signals from said encoding means to generate corresponding linear pulse code modulated signals.

6. The combination in accordance with claim 1 in which said converting means comprises means for receiving linear pulse code modulated signals means for differentially quantizing said linear pulse code modulated signals to produce signals in corresponding differential pulse code modulated format, and means for converting said differential pulse code modulated format to a delta modulation signal format.

7. The combination in accordance with claim 6 in which said converting means comprises means for filtering said pulse code modulated signals to effect a smoothing thereof, means for quantizing any phase differences between said first and second time bases, and means, responsive to the output of said quantizing means, for modifying the transfer characteristic of said filtering means to offset effects of said phase difference in high frequency parts of said characteristic.

8. The combination in accordance with claim 6 in which said differential quantizing means comprises means for subtracting an input pulse code modulated signal character and a corresponding input signal character from a previous character time, means for limiting the amplitude of signals represented by the difference signal in the output of said subtracting means, and accumulator means for coupling an output of said limiting means to an input of said subtracting means.

9. The combination in accordance with claim 8 in which said accumulator means includes means for reducing the magnitude of said corresponding input character by a predetermined factor less than unity for reducing accumulation of errors to successive character times.

10. In combination, means for providing digitally coded signals encoded according to a first time base wherein multibit character signals are included in different character times of recurring time frames, means responsive to said first time base for converting each of said character signals to a corresponding delta modulation signal format which is devoid of both character and frame time base indicia, means for providing a second time base that has no synchronous relationship to said first time base, and means responsive to said second time base for encoding said delta modulated signals in a predetermined pulse code modulated signal format.

11. In a circuit for operationally interfacing first and second digital systems including first and second, respectively, time base clocks, said systems being operable at nominally the same signal sample rate, at least one of said clocks is subject to clock signal time drift with respect to the other of said clocks, means for establishing, under control of said first clock of said first system, a higher sample rate than said nominal rate for digital signals from said first system, means for converting, under control of said clock of said first system, signals from said establishing means to a digital signal format wherein each pulse has equal signal-representative significance with all other pulses, and means, under control of said second clock of said second system, for encoding signals from said converting means in a pulse coded format at said nominal rate for application to said second system.

12. An interfacing circuit in accordance with claim 11 in which said systems are bidirectional communication circuits and said interfacing circuit comprises a set of said establishing, converting, and encoding means for each direction of communication.

13. In combination, means for providing digital signals encoded according to a first time base, means for transmitting digital signals encoded according to a second time base having a frequency and phase independent of said first time base, and means for accommodating said first and second time bases to enable coupling signals between said providing means and said transmitting means and comprising means responsive to said first time base for converting said digital signals from said providing means to a difference modulation format, means for accumulating said difference modulation signals, and means, responsive to said second time base, for periodically sampling the contents of said accumulating means and for resetting said accumulating means to a predetermined accumulation level.

14. In combination, a plurality of means for providing digitally coded signals, means for selectively interconnecting said providing means to enable communication therebetween, said interconnecting means including means for supplying an interconnecting means time base for controlling said interconnecting means, and each of said providing means including its coded signals encoded according to a separate time base for each such providing means to form multibit character signals included in different character times of recurring time frames, such time bases of respective ones of said providing means being unsynchronized with respect to one another and with respect to said interconnecting means time base, means responsive to said providing means time base for converting each of said character signals to a corresponding delta modulation signal format which is devoid of both character and frame time base indicia, and means responsive to said interconnecting means time base for encoding said delta modulation signals in a predetermined pulse code modulated signal format.

* * * * *